Jan. 13, 1970  F. O. SNOW III  3,489,296
ADJUSTABLE FLOW HOPPER GATE
Filed Sept. 11, 1967  4 Sheets-Sheet 1
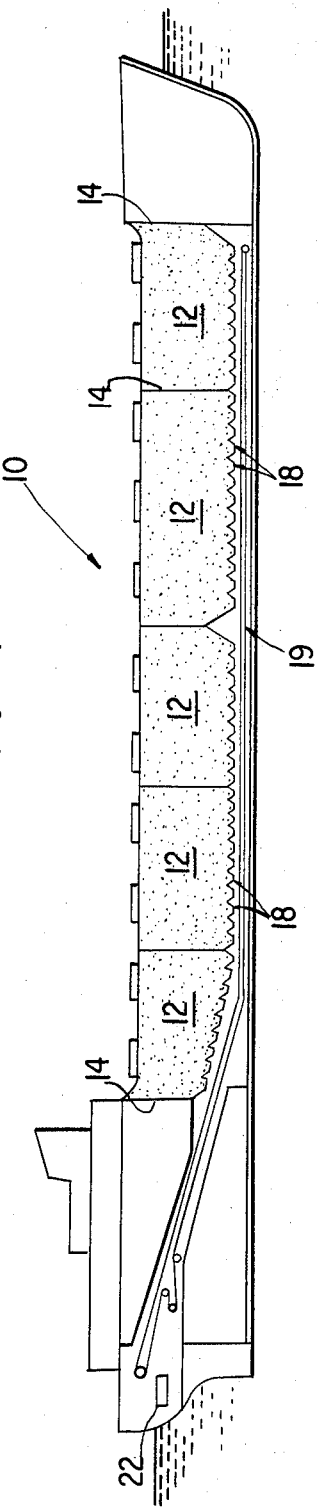
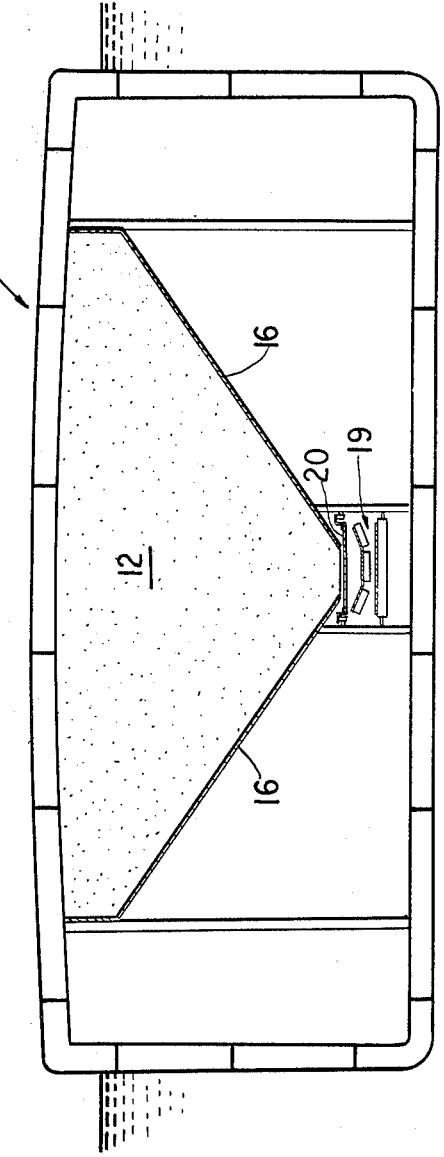
INVENTOR
Frederick O. Snow III
BY
John D. Bond
ATTORNEY Jan. 13, 1970   F. O. SNOW III   3,489,296
ADJUSTABLE FLOW HOPPER GATE
Filed Sept. 11, 1967   4 Sheets-Sheet 2

INVENTOR
*Frederick O. Snow III*
BY
*John L. Bose*
ATTORNEY

INVENTOR
*Frederick O. Snow III*
BY
*John D. Boos*
ATTORNEY

Jan. 13, 1970     F. O. SNOW III     3,489,296
ADJUSTABLE FLOW HOPPER GATE
Filed Sept. 11, 1967     4 Sheets-Sheet 4
FIG. 6
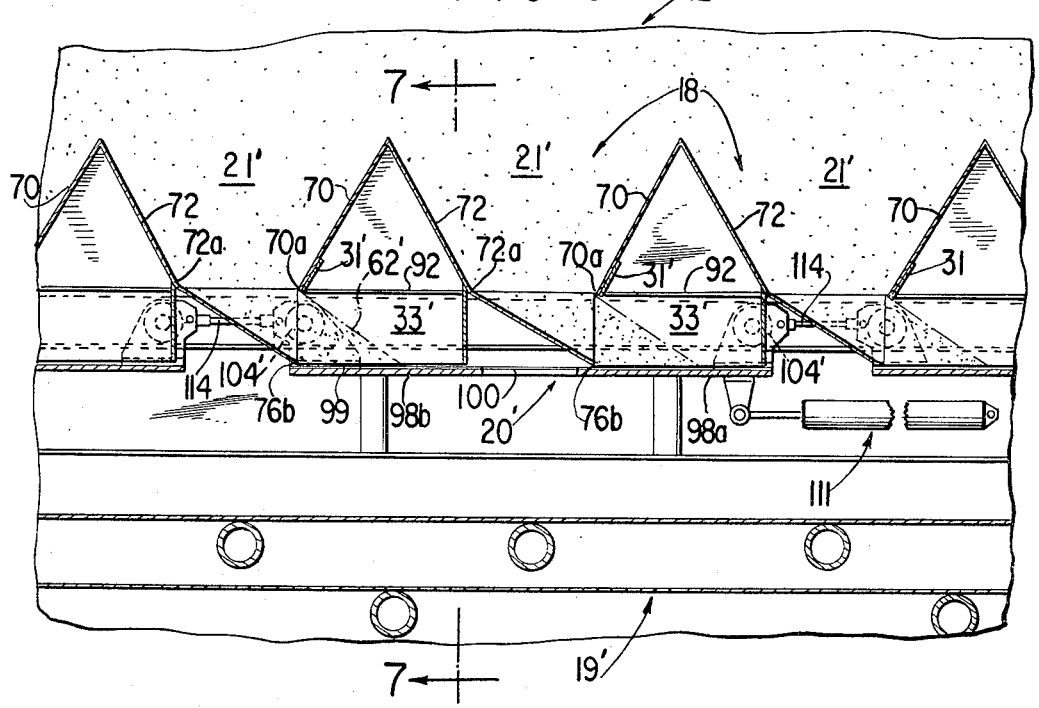
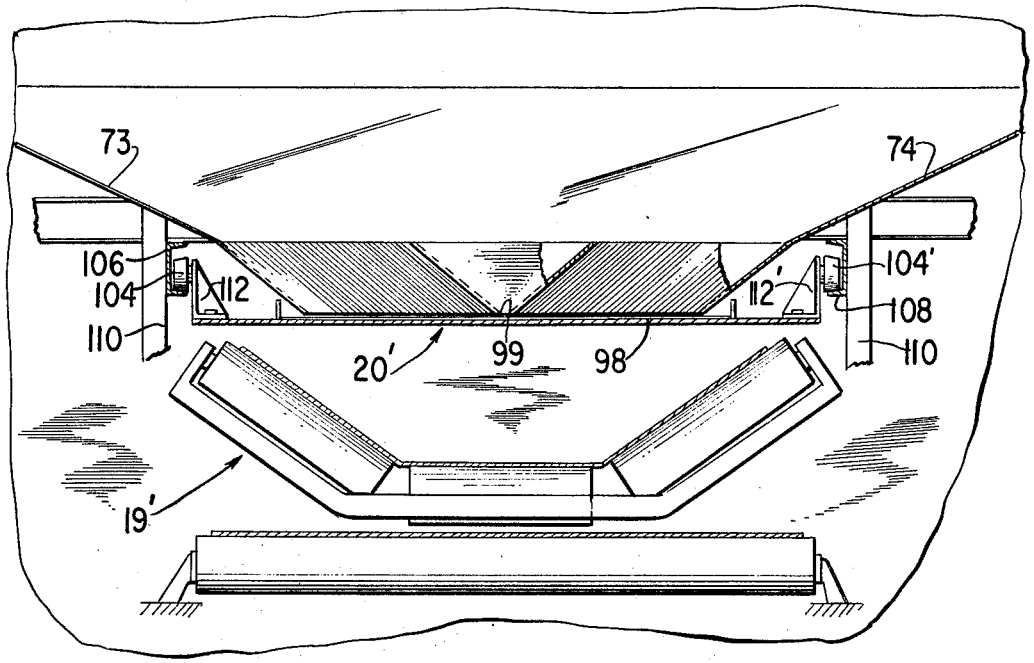
FIG. 7
INVENTOR
Frederick O. Snow III.
BY John D. Boos
ATTORNEY United States Patent Office 3,489,296
Patented Jan. 13, 1970

3,489,296
ADJUSTABLE FLOW HOPPER GATE
Frederick O. Snow III, Wayne, N.J., assignor to Hewitt-Robins Incorporated, Stamford, Conn., a corporation of Delaware
Filed Sept. 11, 1967, Ser. No. 666,671
Int. Cl. B63b 27/04; G01f 11/06, 11/30
U.S. Cl. 214—15                                    10 Claims

ABSTRACT OF THE DISCLOSURE

The present invention relates to storage hopper and gate designs which permit the continuous discharge of bulk materials at extremely low flow rates. The storage hopper is formed with an auxiliary chamber having a bottom opening which is regulated by a slidably mounted gate. The auxiliary chamber is positioned so as to receive only a small amount of material and the gate system can thereby establish extremely low discharge rates. This hopper and gate design permits a series of these gates to be connected together so as to be actuated in unison and is particularly useful in self-unloading vessels handling bulk materials.

BACKGROUND OF THE INVENTION

One of the problems in bulk materials handling has been to provide a gate system for storage hoppers which would control the discharge of the material at extremely low flow rates. While this problem can sometimes be tolerated when each of the gate systems are independently operated, it is frequently advantageous to have a series of these hopper gates connected together and actuated in unison. If this latter situation is desired, it is necessary to be able to exercise fine control at very low flow rates so that the sum of the individual flow rates past the individual gates will be equal to the total desired flow rate. This type of system would be used, for example, in self-unloading cargo vessels handling bulk materials.

Self-unloading cargo vessels are frequently designed with the hull of the vessel partitioned into a number of cargo holds that are essentially large storage hoppers. Located at the bottom of these storage hoppers are a series of hopper gates which open over one or more unloading conveyors. When the hopper gates are opened the bulk material stored in the hoppers is discharged past the hopper gates onto one or more conveyors which then convey the material to additional material handling equipment for transfer to a location outside the ship.

The conventional hopper gate for self-unloading vessels is generally located at the bottom of the hopper with the weight of the stored material resting directly on the gate and with each gate independently actuated. The size of the hopper opening has heretofore been relatively quite large so that when the gate is opened even a small amount the discharge rate is substantial. Furthermore, some bulk materials become so compacted during transit that the gate must be opened a relatively large distance before the compacted material will begin to flow. The flow of material then begins with a sudden surge and there is, therefore, little or no control at the very low discharge rates.

The conventional gate system in self-unloading vessels is usually operated by opening only one or two of the gates and allowing the material to be discharged at or near the maximum flow rate. This type of rapid discharge required careful surveillance in order to insure that the shifting weight distribution caused by discharging the cargo from one area in the ship will not cause the vessel to heel in a particular direction. Furthermore, the impact caused by this rapid discharge of material necessitates the use of a relatively large number of idler roller assemblies spaced close together in order to support the conveying reach of the discharge conveyor belt. In addition, this type of unloading system requires the use of skirt boards on either side of the conveyor belt in order to insure that the bulk material is discharged onto the conveyor belt and does not spill over the edge of the belt. These skirt boards extend above the conveyor and thereby decrease the capacity of the cargo vessel by preventing the storage hoppers from being extended down close to the conveying reach of the discharge conveyor.

SUMMARY OF THE INVENTION

The above described problems are overcome in the present invention by the design of a storage hopper with an auxiliary chamber located at one side of, and in communication with, the main chamber of the storage hopper. The bottom of the auxiliary chamber is formed with an opening that is covered by a slidably mounted hopper gate. This type of arrangement permits the bulk material to enter the auxiliary chamber and come to rest in a sloping fashion on the hopper gate. The gates are adapted to be actuated so that the discharge from the hopper begins at one edge of the sloping pile of material. This results in extremely fine control of a wide range of flow rates and permits a series of hopper gates to be interconnected and actuated in unison.

Accordingly, one object of the present invention is to provide a hopper and gate design which permits accurate control of the discharge rate of material stored in the hopper.

Another object is to provide a hopper and gate design which permits the discharge of material from the hopper to begin at very low flow rates.

Still another object of this invention is to provide a hopper and gate system for self-unloading vessels which enables a number of the cargo holds in the vessel to be gradually unloaded at the same time.

A further object is to provide a series of hoppers at the bottom of a cargo hold in a self-unloading vessel and a series of gates which control the discharge rate from the hoppers and which gates can be actuated in unison.

A still further object of this invention is to provide an improved design for a series of hoppers in a self-unloading vessel whereby the discharge from the hoppers may be regulated by a series of hopper gates coupled together and actuated in unison.

DESCRIPTION OF THE DRAWINGS

Other objects, advantages and novel features of the present invention will become apparent from the following detailed description of the invention when considered in conjunction with the drawings wherein:

FIG. 1 is a longitudinal cross-sectional view through a typical self-unloading vessel.

FIG. 2 is a transverse cross-sectional view through a typical self-unloading vessel and showing the preferred embodiment of the hopper gate in a closed position.

FIG. 6 is a longitudinal cross-sectional view through a portion of the series of storage hoppers in a self-unloading vessel and showing a second embodiment of the present invention.

FIG. 7 is a view taken along line 7—7 of FIG. 6.

DESCRIPTION OF DETAILED EMBODIMENTS

Figure 3:
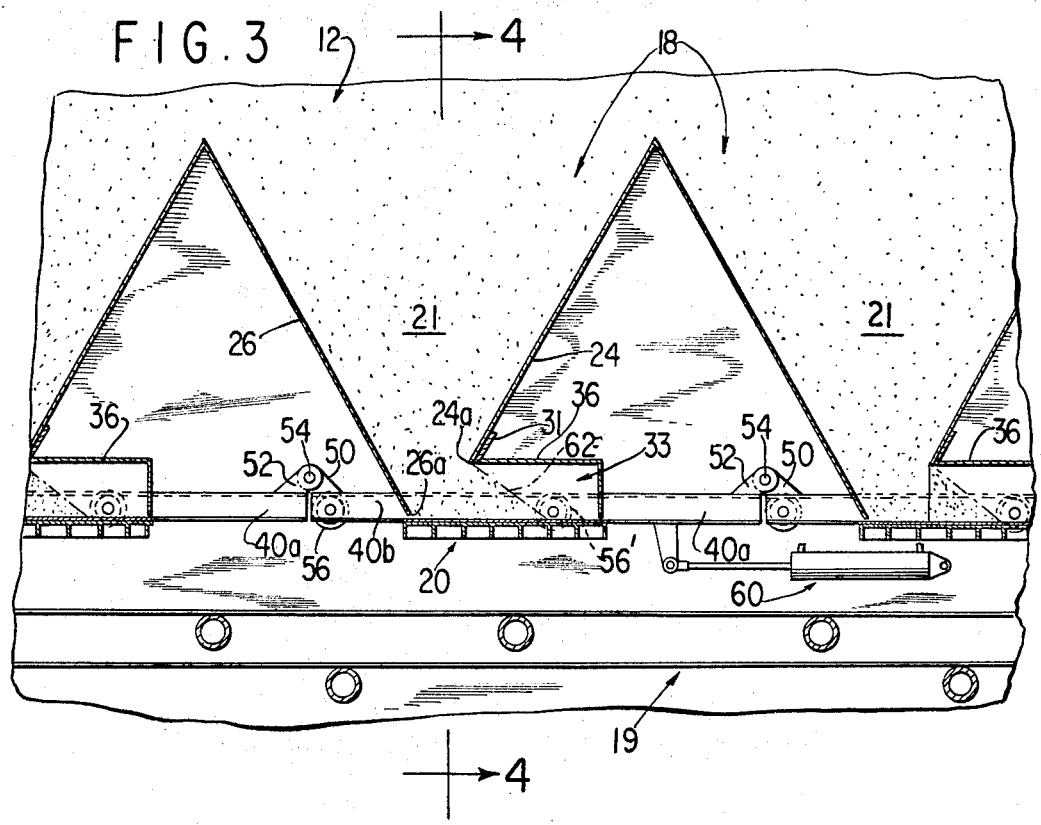
FIG. 3 is a longitudinal cross-sectional view through a series of storage hoppers in a self-unloading vessel and showing the preferred embodiment of the present invention.

Referring now to FIGS. 1 and 2 there is illustrated a typical self-unloading vessel 10 having cargo holds 12 formed between bulkheads 14 and sidewalls 16. As seen in the cross-sectional view of FIG. 2, the sidewalls 16 of the storage hopper incline downwardly toward the bottom of the ship. At the bottom of each cargo hold there are formed a row of secondary hoppers 18 that opens upwardly into the cargo hold and which opens downwardly over a discharge conveyor 19 running longitudinally along the bottom of the ship. The hopper gates 20 of the present invention close the bottom openings of the secondary hoppers 18 and control the discharge of the bulk material from the secondary hoppers onto the discharge conveyor 19. The bulk material on the discharge conveyor is conveyed to, for example, the stern of the vessel where it is transferred to a shuttle conveyor 22 which can be extended out either side of the ship.

Figure 4:
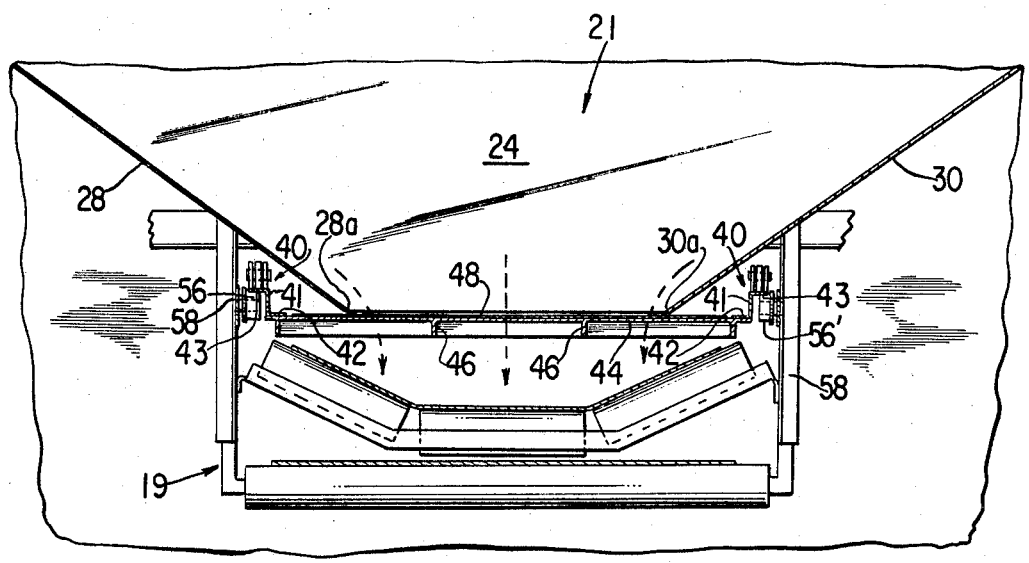
FIG. 4 is a view taken along line 4—4 of FIG. 3.
Figure 5:
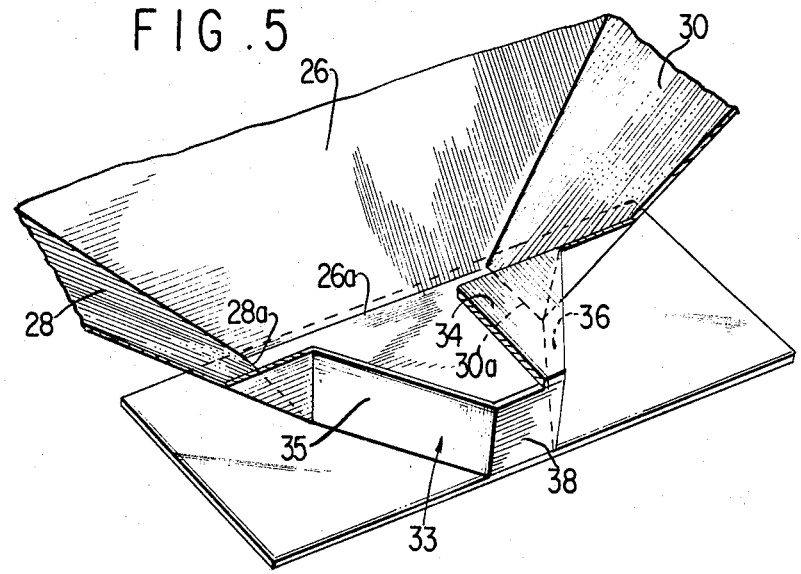
FIG. 5 is a perspective view with parts broken away and parts omitted, of a storage hopper embodying the preferred embodiment of the present invention.

In the embodiment shown in FIGS. 3–5, the secondary hoppers have a main storage chamber 21 made in the shape of substantially inverted truncated pyramidal prisms by front plate 24, rear plate 26 and side plates 28 and 30. The main chamber opens upwardly into the cargo hold and opens downwardly over the discharge conveyor. The bottom edges of both side plates 28a, 30a and the rear plate 26a terminate in a horizontal plane which is slightly lower than the bottom edge 24a of the front plate. An adjusting plate 31 is slidably mounted by any conventional means, such as brackets (not shown) at the lower edge of the front plate 24. The adjusting plate can be extended beyond the lower edge 24a of the front plate in order to change the amount of stored material in the auxiliary chamber 33.

Each secondary hopper also has an auxiliary chamber 33, which extends outwardly in front of the lower edge of the front plate and which communicates with the main storage chamber. Referring to FIG. 5, the auxiliary chamber is made up of a horizontal top plate 34 which is substantially trapezoidal in outline, side strips 35, 36 connected to the inclined sides of the top plate and an end strip 38 which is connected to the shorter base edge of the plate. The top plate 34 extends forwardly from the lower edge 24a of the front plate in a substantially horizontal plane and both side strips and the end strip extend vertically downwardly from the top plate. The lower edges of both side strips and the end strip terminate in the same horizontal plane as the lower edges of the hopper plates 26, 28, 30 and define a trapezoidal opening at the bottom of the auxiliary chamber. The major base or the widest section of the trapezoidal opening is located nearest the main chamber and the minor base or the narrowest section of the opening is located remote from the main chamber. A flat gate 20 covers the openings at the bottom of both the auxiliary chamber and the main storage chamber.

Referring to FIG. 4, each gate has spaced parallel rails 40 formed with web 41 inward directed flange 42 and an outward directed flange 43. The flanges 42 of the spaced rails are coupled to the edges of the flat support plate 44. The support plate is formed with reinforcing ribs 46 on the bottom surface of the plate and has a replaceable liner 48 mounted on the top surface. The side rails have a front end 40a and a rear end 40b as shown in FIG. 3. The side rails extend beyond the support plate and are dimensioned so that when a row of gates are in operative position under a row of hoppers, the front end of a side rail for one gate is in proximity with the rear end of a corresponding rail on the next succeeding gate. An upstanding lug 50 is formed on the top of the rear end of each side rail and a hinge bracket 52 having spaced sides is formed on the top of the front end of each side rail. In operative position the lug of one gate fits between the spaced sides of the hinge bracket of the next gate and a pin 54 interconnects the two gate structures.

As shown in FIG. 4, the outward directed flanges 43 of each side rail rest on spaced rollers 56, 56'. The rollers are connected to spaced vertical members 58 of a support structure and are mounted for rotation about a horizontal axis which is transverse to the longitudinal axis of the vessel. The two rollers 56, 56' supporting each side rail are positioned so as to support the gate at any point between a fully opened or closed position. For this purpose the rollers are positioned so that when the gate is in a closed position, as seen in FIG. 3, the rear end and approximate mid-portion of the side rails rest on rollers 56, 56' respectively. In this manner the rollers will also support the gate when it has been moved rearwardly to a fully opened position.

In operation, a series of these gates are arranged in end to end relationship and are interconnected by the hinge means. A powered actuating means, such as hydraulic means 60, is connected to one of the series of interconnected hopper gates and is adapted to move the entire series of gates between an opened and a closed position. This hydraulic actuating means is, for example, controlled from a remote location by conventional control means. It will be recognized that the bulk material stored within the main cargo holds fill the main chambers of the secondary hoppers 18. At the bottom of the main chamber the stored material enters the auxiliary compartment 33 and comes to rest on the hopper gates in a sloping fashion, as indicated at 62. The particular slope of the material is determined by the material's natural angle of repose which is dependent upon such factors as particle size, consistency and moisture content. The specific amount of material in the auxiliary chamber can be adjusted by extending or retracting the adjusting plates 31.

Figure 8:
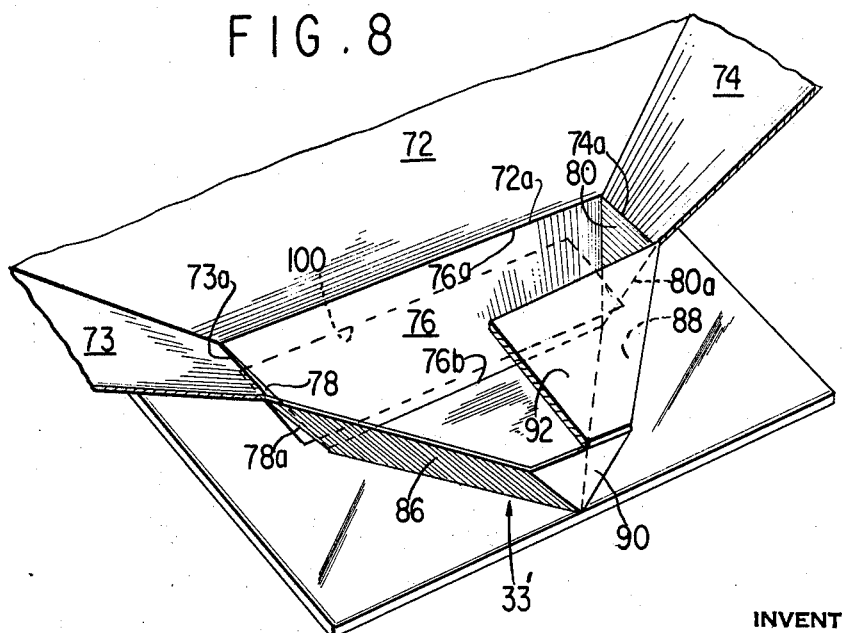
FIG. 8 is a perspective view, with parts broken away and parts omitted, of a storage hopper embodying the second embodiment of the invention.

In the embodiment shown in the FIGS. 6–8, the main chamber 21' of the secondary hopper is formed with front plates 70, rear plates 72, and side plates 73, 74 connecting the front and rear plates. The lower edges of the plates terminate in substantially the same horizontal plane. An adjusting plate 31' is slidably coupled to the front surface of the front plate and is designed to adjust the amount of bulk material resting on the hopper gate as described in the first embodiment. Connected to, and projecting downward from, the lower edges of plates 70, 72, 73, 74 is a material deflecting structure which forms the bottom of the main chamber and forms a vertical opening extending into the auxiliary chamber 33'. The deflecting structure comprises three sheets arranged so as to form a vertical opening that includes the lower edge 70a of the front plate. As shown in FIG. 8, the structure has a trapezoidal center sheet 76 and two triangular side sheets 78, 80. The major base edge 76a abuts the lower edge 72a of the rear plate and slopes downward and forward from the rear plates. The minor base edge 76b of the center sheet terminates in a vertical plane that includes the lower edge 70a of the front plate.

The triangular side sheet 78, is sealed to the lower edge of plate 73 and to the side edge of trapezoidal sheet 76. Similarly, triangular side sheet 80 is sealed to the lower edge of plate 74 and to the other side edge of trapezoidal sheet 76. There is thus a vertical trapezoidal opening at the bottom of the main chamber formed by the edges 76b, 78a and 80a of the deflecting structure and the lower edge 70a of the main chamber.

The auxiliary chamber 33' of each secondary hopper is formed in front of the vertical opening at the bottom of the main chamber 21'. Referring to FIG. 8, the auxiliary chamber comprises side strips 86, 88, end strip 90 and a flat trapezoidal-shaped top plate 92. As seen in FIG. 8, the side strips incline downwardly toward each other from top plate 92 so as to form a substantially trough-like auxiliary chamber. The end wall 90 extends downwardly from the top plate 92 and seals off the opening formed by the ends of the side strips 86, 88 and top plate 92. The lower edges of the side strips 86, 88, and strip 90 and minor base edge 76b define a horizontal triangular opening over the discharge conveyor 19'. As in the first embodiment, the base or widest section of the triangular opening is located nearest the main chamber and the sides of the opening is gradually narrowed to the smallest section, the apex, which is remote from the main chamber. The hopper gate 20' covers the triangular opening and is designed to be moved back and forth between a closed and an opened position.

The hopper gate shown in FIGS. 6–8 is made from plates designed to close two adjacent secondary hopper openings at the same time. For this purpose a rectangular plate 98 has a central rectangular opening 100 formed therein, thus defining a front gate section 98a and a rear gate section 98b. A replaceable liner 99 is coupled to each of these gate sections in the same manner as in the first embodiment. Each side of the hopper gate has guide rollers 104, 104' secured thereto which are adapted to ride over spaced guide rails 106, 108 mounted from vertical members 110 of a support structure. The guide rollers 104, 104' are rotatably mounted from reinforced angle members 112, 112' respectively. The gates are interconnected by linkages 114 interconnecting the rear roller support means of one plate with the front roller support means of the next following plate. In this manner an entire row of hopper gates may be interconnected and actuated in unison by a powered actuating means, such as by a conventional hydraulic piston mechanism 111, similar to that employed in the first embodiment. It will be apparent that each gate is adapted to close the horizontal opening of two adjacent hopper gates.

The operation of the second embodiment is substantially similar to the first embodiment. The bulk material in the cargo holds passes through the lower vertical openings at the bottom of the main chambers 21' and the stored material comes to rest in the auxiliary chamber in a sloping position as indicated by 62'. The amount of material in each auxiliary chamber is adjusted by the use of the adjusting plates 31' so that the discharge from each storage hopper is substantially equal.

In both embodiments the interconnected gates are actuated in unison in a rearward direction by the hydraulic actuating means. The hopper gates first open the narrowest section of the openings at the bottom of the auxiliary chambers until the sloping pile of material on the gates begins to trickle over the front edge of the gates. This low discharge rate is continuous as the bulk material is gravity fed from the main chamber into the auxiliary chamber and over the front of the hopper gates. A more rapid flow rate can be achieved by moving the gate rearwardly as to open a wider section of the openings in the bottom of the auxiliary chamber. It will be apparent that the triangular or trapezoidal openings are particularly useful in this design since the narrowest section of the openings can be positioned remotely from the main chamber so that the bottom edge of the sloping pile of material is located over this narrow section.

The hydraulic actuating means can also reciprocate the gates back and forth in order to aid in the discharge of some bulk materials which might not otherwise be free flowing. The length of the reciprocating stroke and the speed of the stroke would depend upon the particular type of bulk material handled and the desired discharge rate. The controls necessary to impart this reciprocating motion are well known in the art.

It will be recognized that the low discharge rates are achieved with the present design because the auxiliary chambers are designed to receive a relatively small amount of bulk material and because of the size, shape and position of the openings in the bottom of the auxiliary chambers. Small discharge rates are initially obtained by controlling the rate of discharge from the lower edge of the sloping pile of material. Thus, the auxiliary chamber is designed to receive a sloping pile of material and the gate is made to be actuated through a path such that the discharge begins at the lower edge of this sloping pile. Further reduction in the discharge rate is then made by having an opening in the bottom of the auxiliary chamber shaped and positioned such that it is relatively narrow at the normal location of the bottom edge of the sloping pile of material. This small opening serves to further reduce the discharge rate.

The above described hopper and gate design particularly lends itself for use in self-unloading vessels where uniform loading is required, however, this invention is not solely limited to this type of use. This design can be employed whenever accurate regulation of the discharge rate is required. It can be used with one hopper when an extremely low discharge rate is desired and with several hopper gates interconnected together when it is desired to employ a single actuating means.

Obviously many modifications and variations of the present invention are possible in light of the above teaching. It is therefore to be understood that within the scope of the appended claims the invention may be practiced otherwise than as specifically described.

What is claimed is:

1. In a self-unloading vessel handling bulk material having at least one cargo hold formed with a row of secondary hoppers at the bottom of said cargo hold, each of said secondary hoppers opening over a discharge conveyor and having gate means controlling the discharge of the stored material from said secondary storage hoppers, the improvement characterized by each of said secondary storage hoppers being formed with a storage chamber and an auxiliary chamber, the storage chamber being in communication with said cargo hold, the auxiliary chamber positioned at one side of, and in communication with, the storage chamber whereby material in the storage chamber enters the auxiliary chamber, the bottom of each of said auxiliary chambers formed with an opening over said discharge conveyor, said gate means mounted at the bottom of said secondary hoppers for movement between a first and a second position, said gate means covering the openings at the bottom of said auxiliary chambers in said first position whereby material in said auxiliary chambers form sloping piles of material which are supported by said gate means, said gate means in said second position being positioned relative to the openings in said auxiliary chambers whereby material in the sloping piles of material is discharged past said gate means, actuating means coupled to said gate means for moving said gate means between said first and said second positions through a a path which permits material discharged from said hoppers to begin at the lower edges of the sloping piles of material.

2. The improvement described in claim 1 which is further characterized by adjusting means coupled to said storage hoppers for adjusting the amount of material entering said auxiliary chambers.

3. The improvement described in claim 1 wherein the opening formed at the bottom of the auxiliary chamber in each of said secondary hoppers has a wide section located in proximity to the storage chamber and a narrow section located remote from the storage chamber whereby material entering the auxiliary chamber from the storage chamber will form a sloping pile of material having the the lower edge of the pile located in proximity to the narrow section of the opening, said gate means being actuated through a path which first opens the narrow section of the openings.

4. The improvement described in claim 3 wherein said gate means comprises a series of flat support plates arranged in an end to end relation and mounted for movement in a straight line path which is substantially parallel to said discharge conveyor, said support plates located below the openings in the bottom of said auxiliary chamber, said support plates coupled together so that upon actuation by said actuating means said support plates are moved in unison in order to thereby control the discharge of material from said storage hoppers.

5. The improvement described in claim 4 wherein the openings formed in the bottom of said auixiliary chambers are trapezoidal shaped with a major base and a minor base, the major base of each trapazoidal opening being the wide portion of the opening and the minor base being the narrow section of the opening.

6. The improvement described in claim 3 wherein said gate means comprises a series of flat support plates arranged in end to end relation and mounted for movement in a straight line path which is substantially parallel to said discharge conveyor, each of said flat support plates comprising a front gate section and a rear gate section separated by an opening formed in the central portion of the support plate, said support plates being located below the openings in the bottom of said auxiliary chambers whereby said front and rear gate section of each of said support gates are adapted to cover the openings in the bottom of adjacent auxiliary chambers.

7. The improvement described in claim 6 wherein the openings formed in the bottom of said auxiliary chambers are triangular shaped and are formed so that one base of each triangular opening is the wide section of the opening and the apex remote from the base is the narrow section of the opening.

8. A storage hopper comprising a storage chamber and an auxiliary chamber, said auxiliary chamber positioned at one side of, and in communication with, said storage chamber whereby material in said storage chamber enters said auxiliary chamber, the bottom of said auxiliary chamber defining an opening, gate means covering the opening whereby material stored in said storage chamber will enter said auxiliary chamber and form a sloping pile of material on said gate means, said gate means being movable in a path which permits material discharge through the opening in said auxiliary chamber to begin at the lower edge of the sloping pile of material.

9. A storage hopper as defined in claim 8 wherein the opening at the bottom of the auxiliary chamber is formed so as to have a wide section located in proximity to said storage chamber and a narrow section located remote from said storage chamber whereby the material entering said auxiliary chamber from said storage chamber will form a sloping pile of material with the lower edge of the pile located in proximity to the narrow section of the opening, said gate means being actuated through a path which first opens the narrow section of the opening.

10. The storage hopper defined in claim 9 wherein said gate means comprises a flat support plate mounted for movement in a straight line path beneath the opening formed in the bottom of said auxiliary chamber and an actuating means coupled to said first support plate.

References Cited

UNITED STATES PATENTS

| 2,598,388 | 5/1952 | Hurter | 222—328 X |
| 2,794,576 | 6/1957 | Reynolds | 222—270 X |
| 1,466,854 | 9/1923 | Smith. | |
| 3,270,921 | 9/1966 | Nadolske et al. | 222—545 X |

FOREIGN PATENTS

| 916,249 | 1/1963 | Great Britain. |

ROBERT B. REEVES, Primary Examiner

H. S. LANE, Assistant Examiner

U.S. Cl. X.R.

222—270, 328, 486